United States Patent
Jäger

[11] Patent Number: 5,310,906
[45] Date of Patent: May 10, 1994

[54] TRIPHENDIOXAZINE DYESTUFFS

[75] Inventor: Horst Jäger, Leverkusen, Fed. Rep. of Germany

[73] Assignee: Bayer Aktiengesellschaft, Leverkusen, Fed. Rep. of Germany

[21] Appl. No.: 53,851

[22] Filed: Apr. 26, 1993

Related U.S. Application Data

[63] Continuation of Ser. No. 686,056, Apr. 15, 1991, abandoned.

[30] Foreign Application Priority Data

Apr. 24, 1990 [DE] Fed. Rep. of Germany ....... 4012954

[51] Int. Cl.$^5$ .................. C09B 19/00; C09B 62/04
[52] U.S. Cl. .................. 544/76; 544/77; 8/436; 8/516; 8/543; 8/549
[58] Field of Search ............... 544/76, 77; 8/436, 516, 8/543, 549

[56] References Cited

U.S. PATENT DOCUMENTS

| | | | |
|---|---|---|---|
| 4,604,459 | 8/1986 | Jäger | 544/76 |
| 4,780,107 | 10/1988 | Sawamoto et al. | 8/657 |
| 5,122,605 | 6/1992 | Pedrazzi | 544/76 |
| 5,202,436 | 4/1993 | Jager | 544/76 |

FOREIGN PATENT DOCUMENTS

| | | |
|---|---|---|
| 0170838 | 2/1986 | European Pat. Off. |
| 2124080 | 11/1971 | Fed. Rep. of Germany |
| 1349513 | 4/1974 | United Kingdom |
| 2228738 | 9/1990 | United Kingdom |

OTHER PUBLICATIONS

Renfrew, Journal of the Society of Dyers and Colorists, vol. 105, pp. 262-264 (1989).
Miyamoto et al., Chem. Abstract vol. 115, No. 51856; (1990).

*Primary Examiner*—Mukund J. Shah
*Assistant Examiner*—Philip I. Datlow
*Attorney, Agent, or Firm*—Sprung Horn Kramer & Woods

[57] ABSTRACT

The novel triphendioxazine dyestuffs of the formula

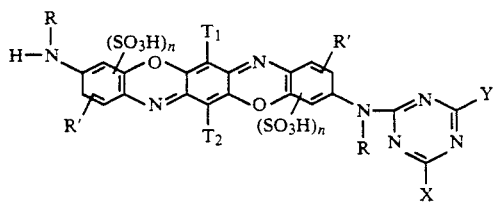

in which the substituents R, R', $T_1$, $T_2$, X, Y and n have the meanings given in the description are highly suitable for the dyeing and printing of cellulose-containing or amido-containing material.

6 Claims, No Drawings

TRIPHENDIOXAZINE DYESTUFFS

This application is a continuation of U.S. patent application Ser. No. 686,056, filed Apr. 15, 1991, now abandoned.

The present invention relates to novel triphendioxazine dyestuffs, processes for their preparation and their use for the dyeing and printing of cellulose-containing and amido-containing material.

The formula

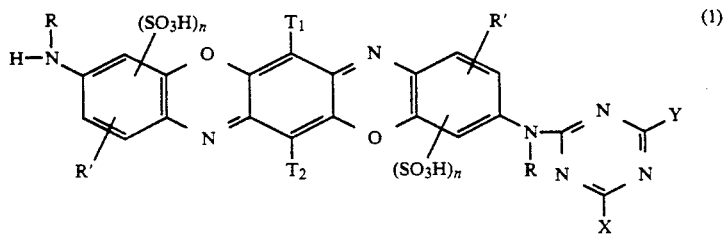

(1)

in which
- R represents hydrogen or substituted or unsubstituted $C_1$-$C_6$-alkyl,
- R' represents hydrogen or a substituent,
- $T_1$ and $T_2$ each represent hydrogen, chloride, bromide, substituted or unsubstituted $C_1$-$C_4$-alkyl, substituted or unsubstituted $C_1$-$C_4$-alkoxy, substituted or unsubstituted phenyl or substituted or unsubstituted phenoxy,
- Y represents a substituted or unsubstituted amino group,
- X represents in each case a substituted or unsubstituted amino, thioether or ether group, hydrogen, substituted or unsubstituted lower alkyl or substituted or unsubstituted phenyl and
- n represents 0 or 1, where where in the case that n represents 1 the sulpho group is in each case in the ortho position relative to the substituents

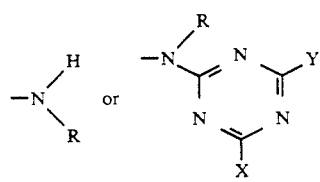

provides a general definition of the novel triphendioxazine dyestuffs.

Examples of substituents R are: $CH_3$, $C_2H_5$, n-$C_3H_7$, i-$C_3H_7$, n-$C_4H_9$, n-$C_6H_{13}$, which can be substituted, for example, by OH, $OCH_3$, $OC_2H_5$, COOH, $SO_3H$, $OSO_3H$, CN or chloride.

Examples of suitable substituents R' are halogen, such as, for example, chlorine, carboxyl, and also $C_1$-$C_4$-alkyl or $C_1$-$C_4$-alkoxy, each of which is substituted or unsubstituted.

Substituents for substituted or unsubstituted $C_1$-$C_4$-alkyl and $C_1$-$C_4$-alkoxy in the definition of $T_1$ and $T_2$ are, for example, $C_1$-$C_4$-alkoxy or —$OSO_3H$.

Examples of substituents for substituted or unsubstituted phenyl and phenoxy in the definition of $T_1$ and $T_2$ are chlorine, bromine, $C_1$-$C_4$-alkyl, $C_1$-$C_4$-alkoxy or —$SO_3H$.

Substituents of phenyl radicals in the definition of X are, for example, chlorine, fluorine, lower alkyl or lower alkoxy.

Examples of substituted or unsubstituted amino groups in the definition of Y are those of the formula

(2)

in which
- $R_1$ represents hydrogen, an aliphatic radical, for example a lower alkyl radical, which is unsubstituted or mono- or disubstituted by hydroxyl, sulphato, lower alkoxy, sulpho, carboxyl or phenyl; an araliphatic radical or a cycloaliphatic radical, for example cyclohexyl, and
- Z represents hydrogen, an aliphatic radical, for example a lower alkyl radical, which is unsubstituted or substituted by hydroxyl, lower alkoxy, sulphato, sulpho and carboxyl, or a substituted or unsubstituted aromatic radical, such as, for example, a phenyl or naphthyl radical, which can be substituted, for example, by halogen atoms, such as fluorine, chlorine, bromine, lower alkyl, lower alkoxy, nitro, sulpho, carboxyl, sulphamoyl, carbamoyl; or can be substituted by alkylcarbonylamino, phenylcarbonylamino, phenylureido, phenylsulphonylamino, alkylaminocarbonyl, phenylaminocarbonyl, phenylsulphonylamino, phenoxy, thiophenoxy, phenylethenyl, phenylamino, phenylsulphonyl, phenylcarbonyl, phenyl- or naphthylazo, each of which is substituted or unsubstituted.

Examples of substituents of the substituted or unsubstituted alkyl radicals in the compound names such as alkylcarbonylamino or alkylaminocarbonyl in the definition of Z are: sulpho, carboxyl, methoxy, hydroxyl or acetylamino.

Examples of substituents of the substituted or unsubstituted phenyl or naphthyl radicals in the compound names, such as phenylcarbonylamino or phenylureido in the definition of Z are: sulpho, carboxyl, lower alkyl, lower alkoxy, chlorine, acetylamino, ureido or hydroxyl. Furthermore, the aromatic radicals mentioned in the definition of Z, such as, for example, phenyl or naphthyl radicals, can be substituted by heterocyclic radicals, which may have been fused on or linked via a single bond or an azo group.

Furthermore

Z represents a substituted or unsubstituted araliphatic radical, examples of suitable substituents being: lower alkyl, lower alkoxy, sulpho, carboxyl; or represents a substituted or unsubstituted heterocyclic radical, suitable substituents being in particular phenyl- or naphthylazo, each of which may in turn be substituted, for example by sulpho, carboxyl, lower alkyl, lower alkoxy or lower alkylcarbonylamino.

Furthermore

Z represents hydroxyl, lower alkoxy or a substituted or unsubstituted amino group, such as, for example, an amino group, a phenylamino or a lower alkylamino group, or $R_1$ and Z, together with the nitrogen atom to which they are bound, represent a saturated 3- to 9-membered, preferably 6- to 8-membered, heterocyclic ring which can contain 1 to 2 hetero atoms, such as oxygen and/or nitrogen, such as, for example, a morpholine, piperidine or piperazine ring.

Examples of substituted or unsubstituted amino groups in the definition of X are those of the formula (2), in which the radicals of the formula (2) representing X and Y can be identical or different.

Examples of substituted or unsubstituted ether groups in the definition of X are those of the formula $$-O-R_3 \qquad (3)$$

in which $R_3$ represents hydrogen or substituted or unsubstituted alkyl, examples of suitable substituents being: substituted lower alkyl, hydroxyl, lower alkoxy, sulphato, sulpho, carboxyl and phenyl which is unsubstituted or substituted by nitro, sulpho or carboxyl.

Examples of substituted or unsubstituted thioether groups in the definition of X are those of the formula $$-S-R_2 \qquad (4)$$

in which $R_2$ represents substituted or unsubstituted alkyl, examples of suitable substituents being: substituted lower alkyl, hydroxyl, lower alkoxy, sulphato, sulpho, carboxyl and phenyl which is unsubstituted or substituted by nitro, sulpho or carboxyl, or represents benzothiazol-2-yl.

Very generally, aliphatic radicals are, for example, substituted or unsubstituted alkyl radicals having 1 to 10 C atoms, which may be interrupted by hetero atoms or hetero atom groupings, for example by O, N, S, CONH, $SO_2NH$, $SO_2$.

Lower alkyl or alkoxy radicals are those having 1 to 4 C atoms.

The radicals R, R', $T_1$ and $T_2$ can be identical or different.

In the context of the formula (1), preferred dyestuffs have the formula

Furthermore, preference is given to dyestuffs of the formulae (1) or (5) in which $T_1$ and $T_2$ represent chlorine or methoxy.

X is preferably a radical of the formula $-S-R_2$ or $-O-R_3$, in which $R_2$ preferably denotes a phenyl radical which can be substituted by chlorine, sulpho or nitro, or a lower alkyl radical which can be substituted by hydroxyl or carboxyl, and $R_3$ is preferably a hydrogen atom or a lower alkyl radical or a phenyl radical which can be substituted by sulpho or carboxyl.

The formula radical X furthermore preferably denotes an amino group of the formula $-NR_1Z$, in which $R_1$ preferably denotes a hydrogen atom or a lower alkyl group which can be substituted by a carboxyl, sulphato or sulpho group and in which Z preferably denotes a hydrogen atom or a lower alkyl group which can be substituted by a hydroxyl, sulphato, carboxyl, sulpho, lower alkoxy group, a phenyl radical or a cyclohexyl radical.

Furthermore, preference is given to amino radicals X in which $R_1$ and Z, together with the nitrogen atom to which they are bound, if desired with the inclusion of a further hetero atom, form a ring.

Preference is given to amino radicals Y of the formula (2) in which $R_1$ represents hydrogen and Z represents the radicals $Z_1$ to $Z_5$, in which $Z_1$ represents 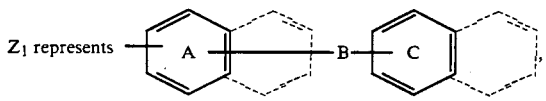

in which the phenylene or naphthylene radical A and the phenyl or naphthyl radical C can be substituted and B represents a direct bond or a bridging member, $Z_2$ represents

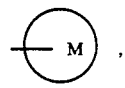

in which M represents the radical of a heterocyclic ring system containing at least two fused 5-membered or 6-membered rings, $Z_2$ preferably represents one of the following radicals:

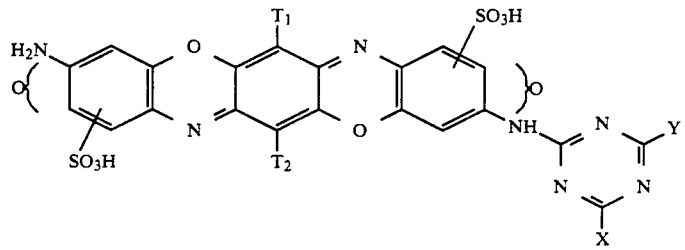

(5)

in which $T_1$, $T_2$, X and Y have the abovementioned meaning.

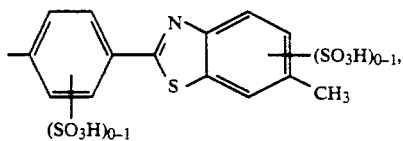

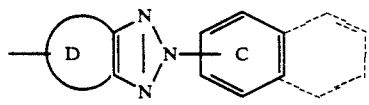

or

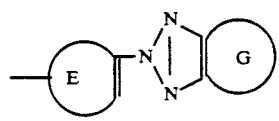

in which

D represents the radical of a substituted or unsubstituted benzene or naphthalene ring and the phenyl or naphthyl ring C can be substituted, E represents a substituted or unsubstituted phenylene or naphthylene radical and G represents the radical of a substituted or unsubstituted benzene or naphthalene ring, $Z_3$ represents

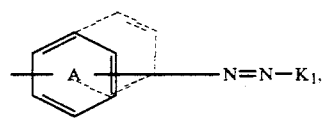

in which $K_1$ represents the radical of a coupling component from the pyridone, pyrazolone or acetoacetarylide series and A has the abovementioned meaning;

$Z_4$ represents

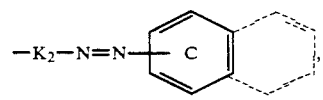

in which $K_2$ represents the radical of a coupling component from the pyridone, pyrazolone or acetoacetarylide series and C has the abovementioned meaning;

$Z_5$ represents

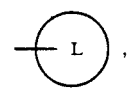

in which

L represents the radical of an aromatic hydrocarbon containing at least three fused rings.

Very generally, preference is given to radicals Z containing at least one water-solubilising group, in particular a sulpho and/or carboxyl group. Further water-solubilising groups are the sulphato and disulphimide groups.

Radical Z preferably contains one to four water-solubilising groups, in particular a sulpho and/or a carboxyl group.

Examples of substituents of the radicals A, C, D, E, G, L and M are: halogen atoms, such as fluorine, chlorine or bromine, $C_1$-$C_4$-alkyl, $C_1$-$C_4$-alkoxy, nitro, sulpho, carboxyl, hydroxyl, $C_1$-$C_4$-alkylcarbonylamino, phenylcarbonylamino, phenylureido, ureido, each of which is unsubstituted or substituted by chlorine, methoxy, methyl. Radical C can in particular also be substituted by phenyl- or naphthylazo groups.

Examples of bridging members B are:

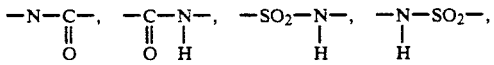

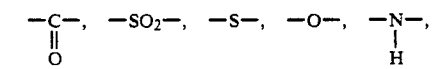

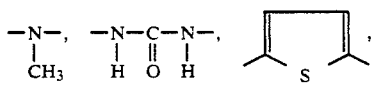

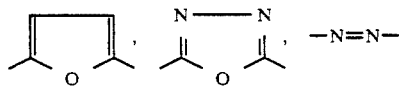

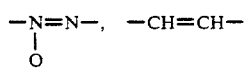

The invention further relates to processes for the preparation of the dyestuffs of the formula (1). They are characterised in that either a) 1 mole of a triphendioxazine dyestuff of the formula

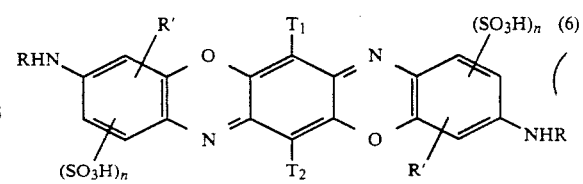 (6)

in which $T_1$, $T_2$, R, R' and n have the abovementioned meaning, is reacted with one mole of a halogenotriazine of the formula

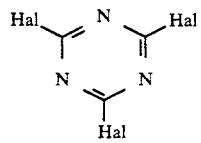 (7)

in which

Hal represents fluorine, chlorine or bromine, and with one mole of the compound of the formula $$H-X_1 \qquad (8)$$

in which $X_1$ represents an amino, thioether or ether group, each of which is unsubstituted or substituted, preferably —$SR_2$, —$OR_3$ or

chosen for the exchange of the first halogen atom, a temperature between 0° C. and 80° C. for the exchange of the second halogen atom, and a temperature between 40° C. and 110° C. for the exchange of the third halogen atom.

Although the individual condensation steps can be carried out in any desired order, it is preferred first to react a dyestuff (6) with a halogenotrizine (7) or (10) to give an acylation product of the formula (11)

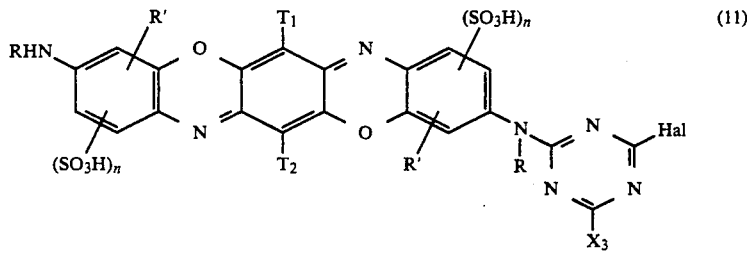

in which $R_1$, $R_2$, $R_3$ and Z have the abovementioned meaning, and with one mole of the compound of the formula $$H-Y \qquad (9)$$

in which

Y has the abovementioned meaning, preferably represents

in which $R_1$ and Z have the abovementioned meanings, in any desired order, or b) one mole of a triphendioxazine dyestuff of the formula 6) is reacted with one mole of compound 10

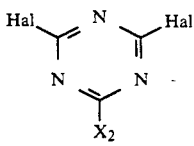

in which

Hal has the abovementioned meaning and $X_2$ represents hydrogen, lower alkyl or phenyl which is unsubstituted or substituted by chlorine, methyl or methoxy, and with one mole of compound (9) in any desired order.

The condensation reactions of the halogenotriazines (7) and (10) with the triphendioxazine dyestuffs (6), compounds (8) and amines (9) are carried out in aqueous or aqueous-organic or organic medium at temperatures between 0° C. and 110° C., during which the hydrohalic acid liberated in the condensation steps is, if desired, trapped by adding acid-binding agents, such as, for example, alkali metal or alkaline earth metal bicarbonates, carbonates, hydroxides, phosphates or borates. The pH range established in this procedure can be selected within wide limits. The individual condensation steps are usually carried out in succession, in which, depending on the reactivity of the halogenotriazine (7) or (10), a temperature between 0° C. and 60° C. is in which R, R', $T_1$, $T_2$, Hal and n have the abovementioned meaning and $X_3$ has the meaning Hal or $X_2$, which is then condensed with compounds (8) or (9), it being preferable to use the amine having the highest basicity or the compound having the highest nucleophilicity for the exchange of the last halogen atom.

Furthermore, preference is given to the process variant in which the individual steps are carried out in succession but in a "one-pot reaction".

For the condensation reactions, the triphendioxazine dyestuffs (6) are preferably used in the form of their neutral alkali metal salts, in particular their lithium salts.

Dyestuffs of the formula (6) are known from the literature. Thus, for example, their preparation has been described in European Patent Specification 170,838.

Example of halogenotriazines (7) are:
2,4,6-trichlorotriazine (cyanuric chloride)
2,4,6-trifluorotriazine
2,4,6-tribromotriazine.

Examples of halogenotriazines (10) are:
2,4-dichloro-6-H-trizine
2,4-dichloro-6-methyl-triazine
2,4-dichloro-6-phenyl-traizine.

Cyanuric chloride is a preferred meaning.

Examples of compounds of the formula (8) and (9) are as follows:

alcohols $HOR_3$ (8):
methanol, ethanol, isopropanol, β-methoxyethanol, β-ethoxyethanol, glycolic acid;

phenols and naphthols $HOR_3$ (8):
phenol, 4-nitrophenol, 4-sulphophenol, 4-carboxyphenol, p-cresol, salicylic acid, 2-hydroxy-6-sulphonaphthalene;

alkyl mercaptans $HSR_2$ (8):
mercaptoethanol, mercaptoacetic acid, β-mercaptopropionic acid, 1-mercapto-2-hydroxypropane, 1-hydroxy-2-mercaptopropane;

aromatic and heterocyclic mercaptans $HSR_2$ (8): thiophenol, 4-nitrothiophenol, 4-sulphothiophenol, 4-carboxythiophenol, 2-mercaptobenzothiazole, 2-mercaptobenzothiazole-x-sulphonic acid;

aliphatic amines $HNR_1Z$ (9):
ammonia, methylamine, ethylamine, diethylamine, isopropylamine, taurine, methyltaurine, amino sulphate, N-methyl-β-sulphatoethylamine, ethanolamine, bis(β-hydroxyethyl)amine, β-methoxyethylamine, bis(β-methoxyethyl)amine, aminoacetic acid, sarcosine, β-aminopropionic acid, aminosuccinic acid, diethylenetriamine, triethylenetetramine, tetraethylenepentamine, pentaethylenehexamine, N-methylaminomethanesulphonic acid, bis-(β-sulphatoethyl)-amino, β-(sulphatoethyl) β'-aminoethyl sulphone, 3-aminosulpholane;

aromatic amines HNR₁Z (9):

aniline, p-toluidine, 4-methoxyaniline, 4-ethoxyaniline, 2-methoxyaniline, N-ethylaniline, m-sulphanilic acid, 4-aminophenyl-ω-methanesulphonic acid, p-sulphanilic acid, 4-aminobenzoic acid;

4-methoxyaniline-2-sulphonic acid, 4-methylaniline-2-sulphonic acid, 4-methoxyaniline-3-sulphonic acid, 4-methylaniline-3-sulphonic acid, 4-chloroaniline-2-sulphonic acid, 2-amino-4-sulphobenzoic acid, 2-amino-5-sulphobenzoic acid, 2-aminonaphthalene-6-sulphonic acid, 2-aminonaphthalene-6,8-disulphonic acid, 2-amino-6-acetylaminonaphthalene-4,8-disulphonic acid, 1-aminonaphthalene-4-sulphonic acid.

Aromatic amines (9) of the following formulae have a preferred meaning:

$$H-N-Z_1 \text{ bis } H-N-Z_5$$
$$\phantom{H-N-}R_1 \phantom{\text{ bis } H-N-}R_1$$

$$H-N-Z_1:$$
$$\phantom{H-N-}R_1$$

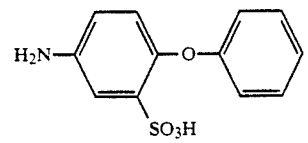

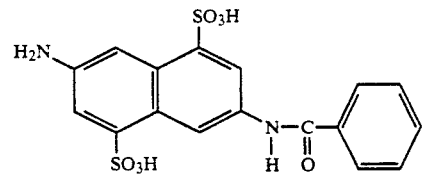

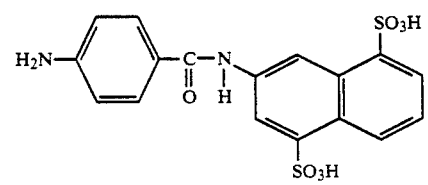

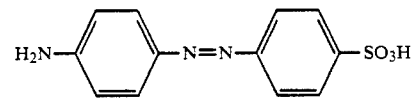

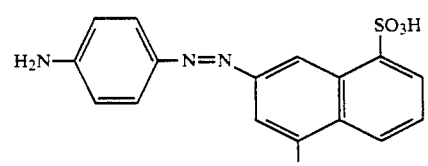

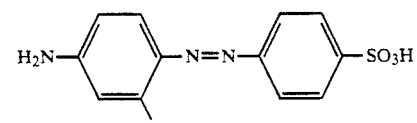

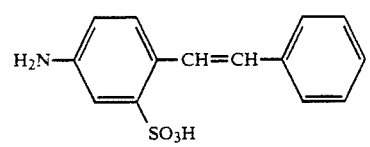

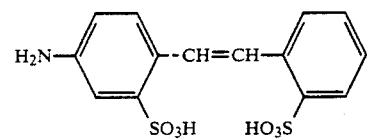

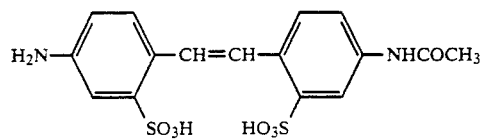

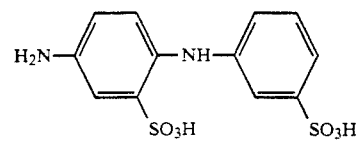

-continued
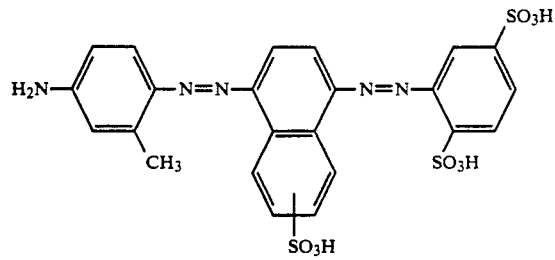
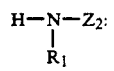
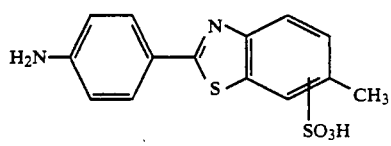
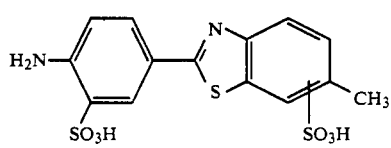
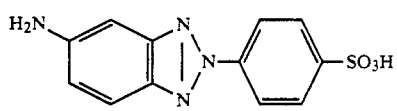
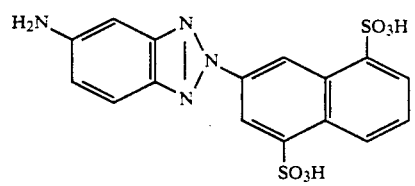
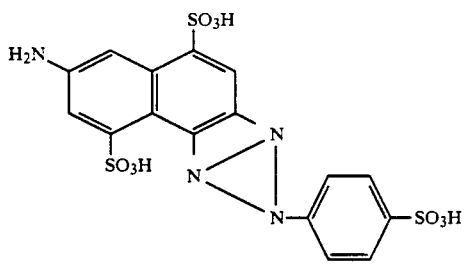
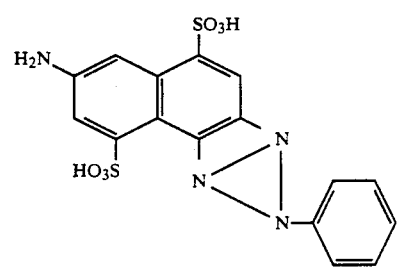
-continued
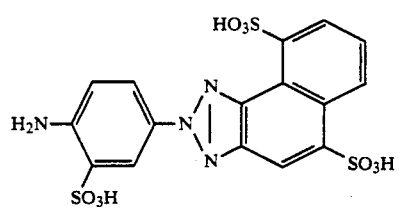
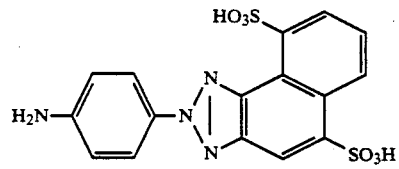
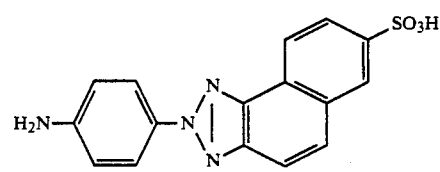
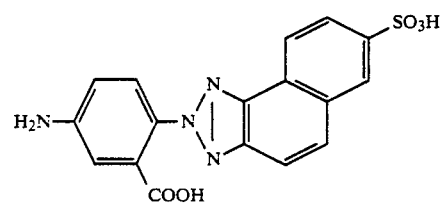
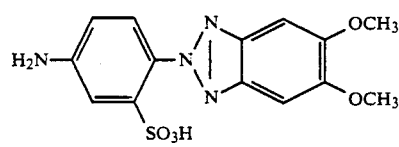
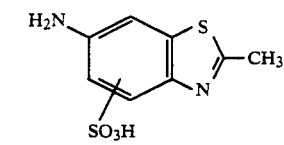
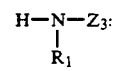
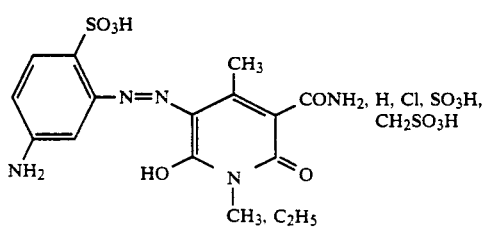

-continued

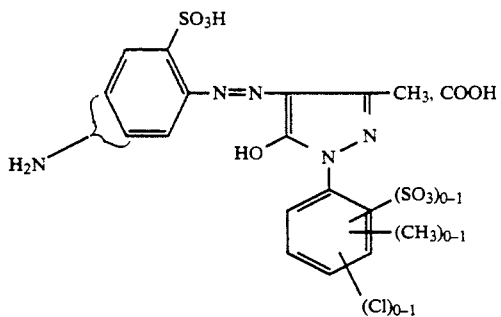

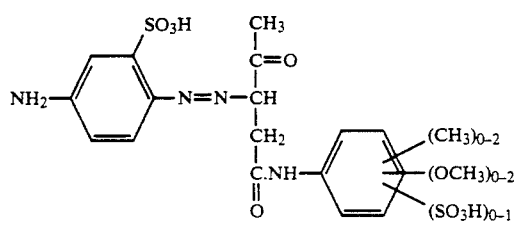

H—N—Z$_4$:
   |
   R$_1$

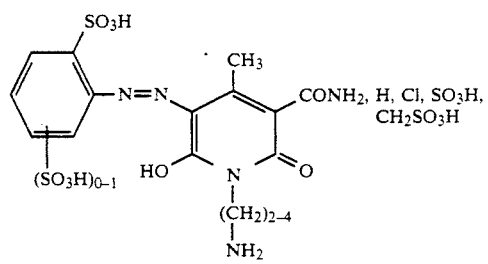

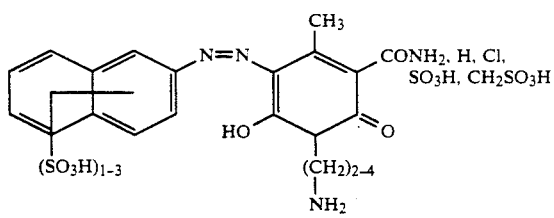

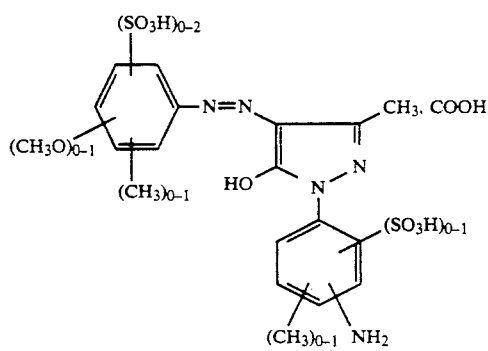

-continued

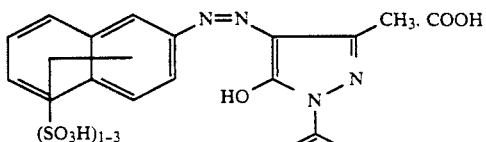

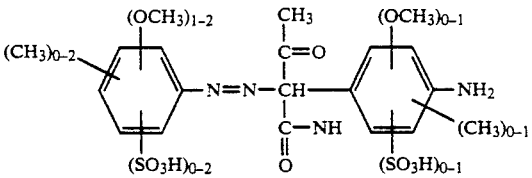

H—N—Z$_5$:
   |
   R$_1$

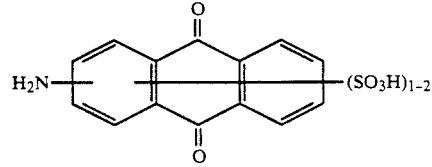

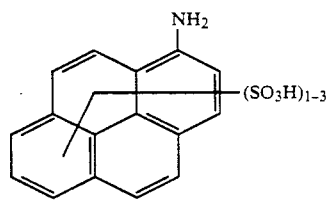

cycloaliphatic amines HNR$_1$Z (9):
cyclohexylamine, cyclopentylamine;
araliphatic amines HNR$_1$Z (9):
benylamine, N-methylbenzylamine, N-methylbenzylamine-x-sulphonic acid;
ring-closed amines HNR$_1$Z (9):
morpholine, piperidine, pyrrolidine, N-methylpiperazine.

The dyestuffs are isolated, for example by addition of salt, and dried. However, it is also possible to lead the condensation solutions or suspensions through a drum or spray drier.

Just as well, concentrated aqueous solutions can be prepared from the moist pastes of the dyestuffs, for example by subjecting suspensions or solutions of these dyestuffs in water to desalting, for example by pressure permeation.

The dyestuffs dye cellulose-containing materials, in particular paper, cotton and viscose and leather in blue hues which have good wet and light fastness properties.

The dyestuffs can be used by all processes customary in the paper and textile industry for direct dyestuffs, in particular in mass and surface coloration of paper for sized and unsized grades, stating from bleached or unbleached pulp of various provenance, such as softwood or hardwood sulphite and/or sulphate pulp. They can also be used in the yarn- or piece-dyeing of cotton, viscose and linen by the exhaust process from long liquor or in continuous processes.

The paper dyeings obtained with the dyestuffs according to the invention are distinguished by good light and wet fastness (bleeding fastness). The brilliance and clarity of the shades may also be mentioned. Furthermore, their compatibility with suitable dyestuffs is very good.

The formulae of the water-soluble dyestuffs in the description and in the examples are those of the free acids. The dyestuffs are in general isolated and used in the form of their alkali metal salts, in particular lithium salt, sodium salt or potassium salt.

After the condensation step was complete, the mixture was heated to 75° C. and morpholine was added dropwise at such a rate that the pH was 8.5. The exchange of the third chlorine atom is completed when the pH no longer changes. The dyestuff was salted out by addition of 5% by volume of sodium chloride, dried at 90° C. and ground, giving a dyestuff powder forming a clear blue solution in water and dyeing cotton by a dyeing process customary for direct dyes in clear blue shades (hue indicator number 13).

The dyestuff has the formula

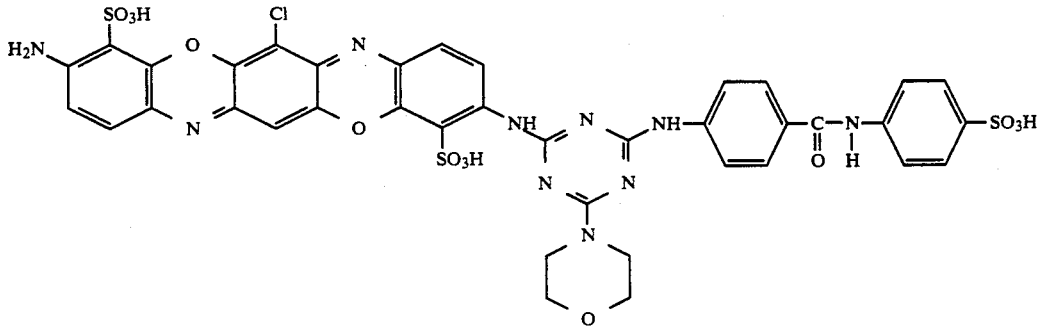

The hue indicator numbers given in the examples refer to the Colour Index Hue Indication Chart (indicator numbers).

The formulae given in the examples which follow refer in each case to one of the isomeric reaction products formed in the reaction, reference being made with respect to the substituents in the two outer aromatic rings of the triphendioxazine system of the isomeric reaction products to what has been said under formula (1).

The dyestuffs of the present invention are also suitable for the dyeing of natural proteins, such as wool, silk and leather, and synthetic polyamides.

Further valuable dyestuffs which dye cotton in clear blue shades (hue indicator number 13) by direct dyeing methods were obtained analogously to the procedure of Example 1, by using the dyestuff used there for the exchange of the first chlorine atom on the cyanuric chloride, amines (I) mentioned in column 1 for the exchange of the second chlorine atom and amines (II) listed in column 2 for the exchange of the third chlorine atom.

EXAMPLE 1

0.1 mol of 2,9-diamino-6,13-dichlorotriphendioxazine-disulphonic acid (obtained according to Example 1 of European Patent Specification 170,838 or Journal of the Society of Dyers and Colorists Volume 105, page 262–263; the dyestuff is present in the form of a double betaine) was stirred in 2 l of water and dissolved with lithium hydroxide solution under neutral conditions. 500 g of ice was then added, 0.1 mol of cyanuric chloride was scattered into the solution and the mixture was stirred at 0° C. to 5° C. until only traces of the starting material could be detected in the thin-layer chromatogram. During the acylation, the pH was maintained between 4.5 and 5.5 by dropwise addition of lithium hydroxide solution. 0.1 mol of the amine of the formula

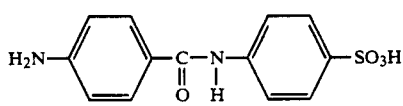

was then added in the form of the neutral lithium salt, and the mixture was heated to 40° C. to 50° C., while at the same time trapping the hydrochloric acid liberated by dropwise addition of lithium hydroxide solution, so that the pH was 4.5 to 5.5.

| Example | Amines (I) | Amines (II) |
|---|---|---|
| 2 | 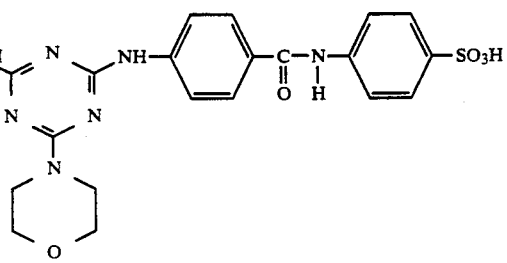 | ammonia |
| 3 | " | ethanolamine |
| 4 | " | diethanolamine |
| 5 | " | methylamine |
| 6 | " | N-methyl-β-hydroxyethylamine |
| 7 | " | aminol sulphate |
| 8 | " | N-methyl-β-sulphatoethylamine |
| 9 | " | aminoacetic acid |
| 10 | " | N-methylaminoacetic acid |
| 11 | " | β-aminopropionic acid |
| 12 | " | N-methylaminomethanesulphonic acid |
| 13 | " | diethylamine |
| 14 | " | dimethylamine |
| 15 | " | 3-aminosulpholane |
| 16 | " | taurine |
| 17 | " | N-methyltaurine |
| 18 | " | bis(2-sulphatoethyl)amine |
| 19 | H$_2$N–⌬–C(=O)–N(H)–⌬–SO$_3$H | β-(N-β'-carboxyethylcarbonylamino)ethylamine |
| 20 | " | 3-amino-1- |

-continued

| Example | Amines (I) | Amines (II) |
|---|---|---|
|  |  | propanol |
| 21 | " | 3-methoxypropyl-amine |
| 22 | " | 3-ethoxypropyl-amine |
| 23 | " | 3-butoxypropyl-amine |
| 24 | " | 1-amino-2-propanol |
| 25 | " | 2-(2-amino-ethylamino)-ethanol |

Further valuable dyestuffs which dye cotton in clear blue shades (hue indicator number 13) by direct dyeing methods were obtained by the procedure of Example 1, by using the same dyestuff and the aliphatic amines (II) used in Examples 1 to 25 and amines (I) mentioned below.

| Example | Amines (I) |
|---|---|
| 26–50 | H$_2$N–C$_6$H$_4$–C(O)–NH–C$_6$H$_4$–SO$_3$H (4-amino, 3'-sulfo) |
| 51–75 | H$_2$N–C$_6$H$_4$–C(O)–NH–C$_6$H$_4$–SO$_3$H (3-amino, 4'-sulfo) |
| 76–100 | 4-aminobenzoyl-amino-(4-sulfo-2-carboxy)phenyl |
| 101–125 | 4-amino-2-sulfophenyl benzamide |
| 126–150 | 4-amino-3-sulfophenyl benzamide |
| 151–175 | 4-amino-2-sulfo-stilbene |
| 176–200 | 7-amino-3-acetamido-naphthalene-1,4,5-trisulfonic acid derivative |
| 201–225 | 7-amino-naphthalene-triazole-(4-sulfophenyl) trisulfonic acid |
| 226–250 | 2-(4-aminophenyl)-2H-naphtho[1,2-d]triazole-sulfonic acid derivative |
| 256–275 | 2-(4-amino-2-sulfophenyl)-5,6-dimethoxybenzotriazole |
| 276–300 | 2-(4-amino-2-sulfophenyl)-4-methyl-triazole |
| 301–325 | 4-amino-2-methyl-phenyl-azo-azo-(4-sulfophenyl) |
| 326–350 | 4-amino-2-methyl-phenyl-azo-azo-(2,5-disulfophenyl) |
| 351–375 | 2-(4-amino-3-sulfophenyl)-7-methyl-benzothiazole-sulfonic acid |

| Example | Amines (I) |
|---|---|
| 376–400 | 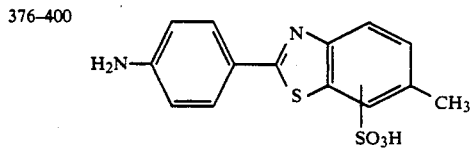 |
| 401–425 | (H₂N-naphthalene-SO₃H) |
| 426–450 | (H₂N-naphthalene with two SO₃H and NHC(O)phenyl) |

| Example | Amines (I) |
|---|---|
| 451–475 | 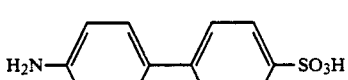 |

Further valuable dyestuffs which dye cotton in clear green shades (hue indicator number 16 or 17) by direct dyeing methods were obtained by the procedure of Example 1, by using the same triphendioxazine dyestuff for the exchange of the first chlorine atom, the aliphatic amines used in Examples 1 to 25 for the exchange of the third and the aminoazo dyestuffs (III) listed below for the exchange of the second chlorine atom.

| Example | Aminoazo dyestuffs (III) | Hue indicator number |
|---|---|---|
| 476–500 | 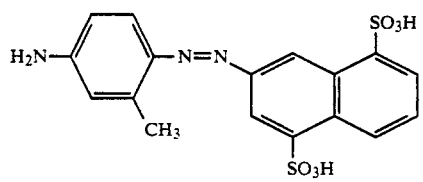 | 16 |
| 501–525 | 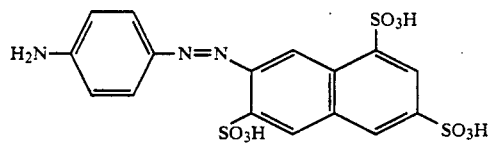 | 16 |
| 526–550 | 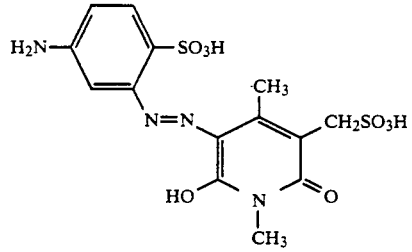 | 17 |
| 551–575 | 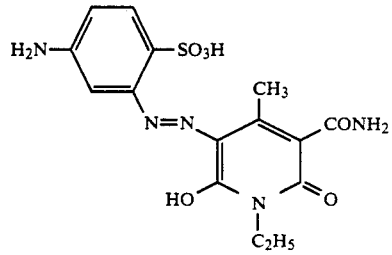 | 17 |

| Example | Aminoazo dyestuffs (III) | Hue indicator number |
|---|---|---|
| 576–600 | 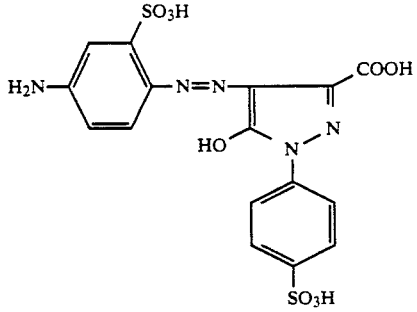 | 16 |
| 601–625 | 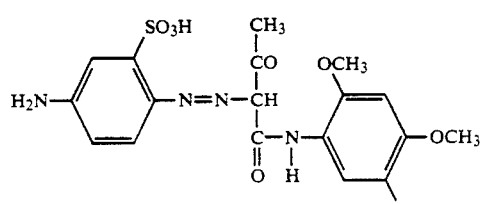 | 16 |

Example 626

The exchange of the first and second chlorine atom was first carried out analogously to the procedure of Example 1, except that 0.1 mol of m-sulphanilic acid was used in the form of a neutral lithium salt for the exchange of the third chlorine atom instead of morpholine, and the mixture was heated at 100° C. until the exchange of the third chlorine atom had taken place. The hydrochloric acid liberated was neutralised. The dyestuff was salted out with 4% by volume of sodium chloride, filtered off with suction, dried and ground. The dyestuff dyes cotton in a clear blue (hue indicator number 13) by direct dyeing methods. It has the formula

| Example | Amines (IV) |
|---|---|
| 627 | aniline |
| 628 | 4-amino-benzylsulphonic acid |
| 629 | 4-methoxyaniline |
| 630 | 3-aminobenzoic acid |
| 631 | 2-aminonaphthalene-4,8-disulphonamid |
| 632 | N-(4'-sulphophenyl)-4-aminobenzamide |
| 633 | 4-benzoylamino-1-aminobenzene-3-sulphonic acid |
| 634 | 2-amino-6-sulphonaphthalene |

Example 635

The exchange of the first and second chlorine atom

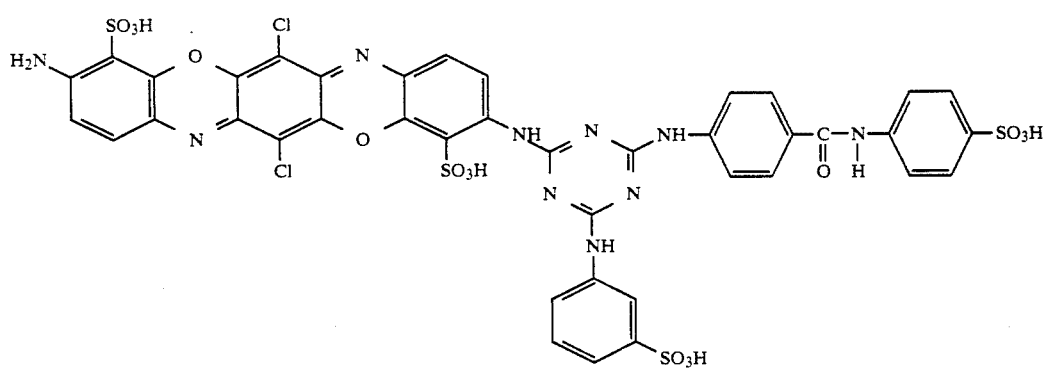

Further valuable dyestuffs which dye cotton in a clear blue (hue indicator number 13) were obtained by the procedure of Example 626, by using the amines (IV) listed below for the exchange of the third chlorine atom.

was first carried out by the procedure of Example 1, except that 0.1 mol of 2-mercaptoethanol was used instead of morpholine. The temperature for the exchange of the halogen atom was maintained at 75° C. to 85° C. and the pH at 7.0 to 8.0. After the exchange was complete, the dyestuff was salted out, filtered off with suction, dried and ground. It dyes cotton in a clear blue (hue indicator number 13) by direct dyeing methods.

The dyestuff has the formula

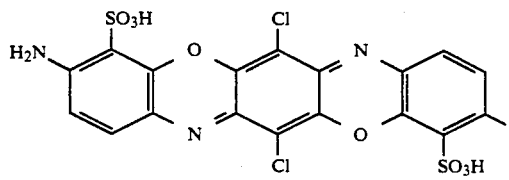

Further valuable dyestuffs which dye cotton in a brilliant blue by direct dyeing methods were obtained by the procedure of Example 635, by using an equivalent amount of the mercapto compounds, phenols and naphthols mentioned below instead of mercaptoethanol.

| Example | |
|---|---|
| 636 | mercaptoacetic acid |
| 637 | 2-mercaptobenzothiazole |
| 638 | 2-mercaptobenzothiazole-X-sulphonic acid |
| 639 | phenol |
| 640 | 4-nitrophenol |
| 641 | 4-sulphophenol |
| 642 | 2-hydroxynaphthalene-6-sulphonic acid |
| 643 | 2-hydroxynaphthalene-6,8-disulphonic acid |

Further valuable dyestuffs which dye cotton in a brilliant blue by direct dyeing methods were obtained by the procedure of Example 1 and Example 635, by using amines (I) used in Examples 26 to 475 for the exchange of the second chlorine atom and the mercapto compounds, phenols and naphthols used in Examples 635 to 643 for the exchange of the third chlorine atom.

Example 644

The acylation of the dyestuff using cyanuric chloride was first carried out by the procedure of Example 1. The pH was then brought to 8.5 with morpholine, the mixture was heated to 30° C. to 35° C., while maintaining the pH at 8.5 by dropwise addition of further morpholine until the exchange of the second halogen atom had taken place. The temperature was then increased to 75° C. to 80° C. and the pH was maintained at 8.5 by addition of morpholine. After the exchange of the third chlorine atom, the dyestuff was salted out, filtered off with suction, dried and ground. It dyes cotton in a clear blue (hue indicator number 13) by direct dyeing methods and wool and polyamide in clear blue shades which have good fastness properties as an acid dye.

It has the formula

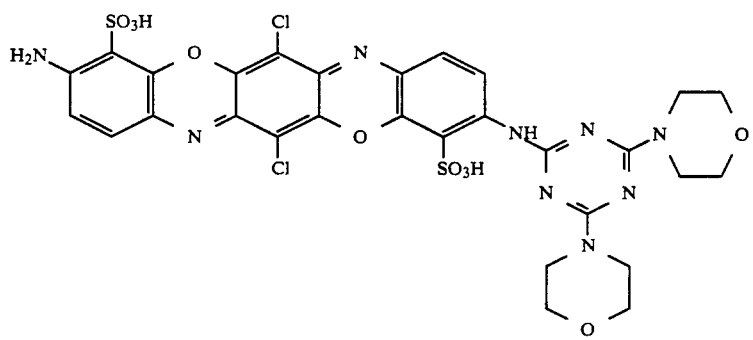

A dyestuff having similar properties was obtained by using diethanolamine instead of morpholine.

Example 645

0.1 mol of the triphendioxazine dyestuff of the formula (present in the form of a double betaine)

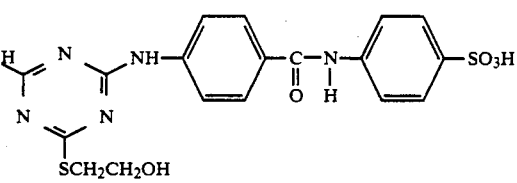

were suspended in 1.5 l of water and dissolved with lithium hydroxide solution under neutral conditions. 600 g to 700 g of ice was then added, and 1.35 g of trifluorotriazine were added dropwise, while maintaining the pH between 5 and 6 by dropwise addition of lithium hydroxide solution. In some cases, a small amount of trifluorotriazine had to be added again. 0.1 mol of 2-amino-6-acetylamino-4,8-disulphonaphthalene was then added, and the temperature was allowed to rise to 15° C. to 20° C., while maintaining the pH at 5 to 6 by addition of lithium hydroxide solution. After the second fluorine atom had been exchanged, the mixture was heated to 50° C. to 60° C., and morpholine was added dropwise until the pH was 8.5. The exchange of the third fluorine atom was complete when no more morpholine was necessary to maintain the pH at 8.5. The dyestuff was salted out, filtered off with suction, dried and ground. It is identical to the dyestuff obtained in Example 176.

The procedure of Example 1 was repeated, replacing 2,9-diamino-6,13-dichlorotriphendioxazinedisulphonic acid by an equimolar amount of 2,9-diamino-6,13-dimethoxytriphendioxazinedisulphonic acid or 2,9-diamino-6,13-diethoxytriphendioxazinedisulphonic acid. The remaining procedure was as in Examples 1 to 475, to give likewise direct dyestuffs which dye material containing cellulose fibres in clear, strong reddish blue shades.

Example 646

0.7 mol of 2,9-diamino-6,13-dichlorotriphendioxazine-disulphonic acid was dissolved in 2 l of water in the form of the neutral lithium salt. 0.1 mol of 2,4-dichloro-6-(β-methoxyethoxy)triazine was then added dropwise, while maintaining the pH between 5 and 6 by dropwise addition of lithium hydroxide solution. The temperature was 25° C. to 30° C.: after the condensation was complete the mixture was heated to 75° C. to 80° C. and morpholine was added dropwise so that a pH of 8.5 was reached. The exchange of the second chlorine atom had taken place when no moremorpholine was consumed.

was dissolved in 1 l of ice water under neutral conditions. 0.1 mol of cyanuric chloride was then scattered in the solution and the pH was maintained at 5 to 6 by dropwise addition of lithium hydroxide solution. After the condensation was complete, 0.1 mol of the triphendioxazine dyestuff from Example 1 was added, and the mixture was heated to 70° C., during which the hydrochloric acid liberated was tapped by dropwise addition of lithium hydroxide solution in such a manner that the pH was between 4.5 and 5.5. After the exchange of the second chlorine atom, 0.2 mol of diethanolamine was added, and the mixture was heated to 90° C. until the exchange of the third chlorine atom was complete. The dyestuff was isolated by spray-drying.

It has the formula

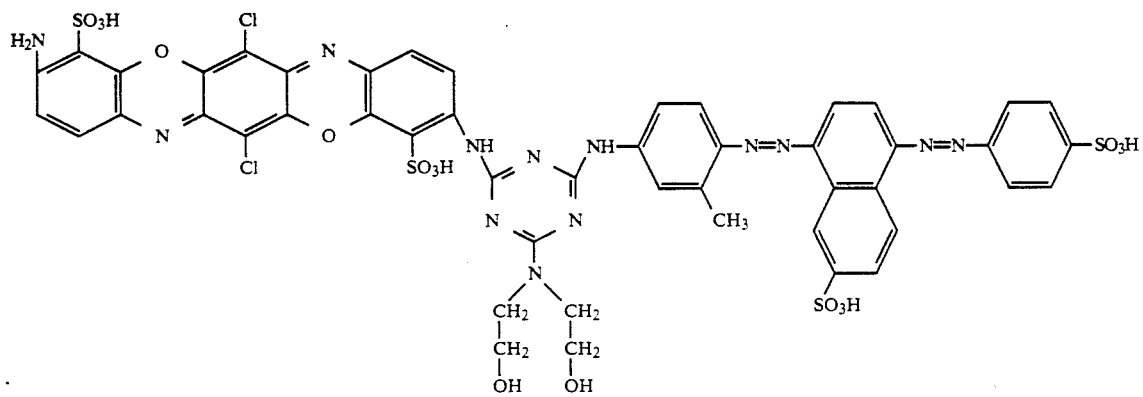

The dyestuff was then salted out, filtered off with suction, dried and ground.

It dyes wool or polyamide fibres as an acid dye in a clear blue (hue indication number 13).

It has the following structure:

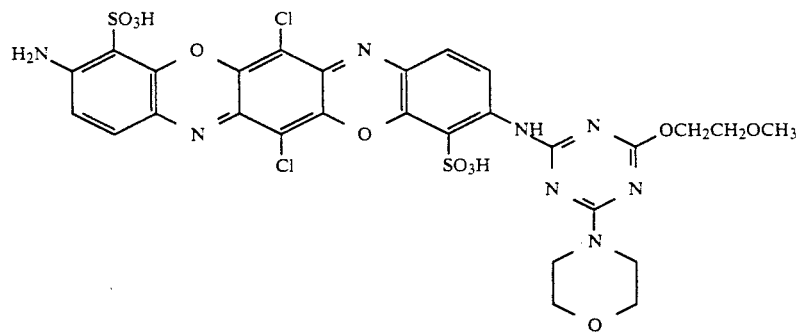

A dyestuff having similar properties was obtained by the procedure of this example by using an equivalent amount of 2,4-dichlorotriazine or 2,4-dichloro-6-methyltriazine instead of 2,4-dichloro-6-(β-methoxyethoxy)triazine.

Example 647

0.1 mol of the disazo dyestuff of the formula

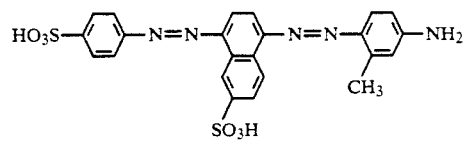

It dyes cotton by direct dyeing methods in grey hues having good fastness properties.

Further dyestuffs which dye cotton by direct dyeing methods in grey hues were obtained by the procedure of Example 647 by using the dyestuffs shown below instead of the disazo dyestuff used there.

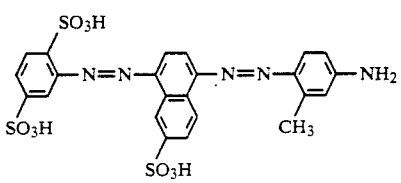

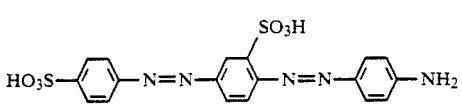

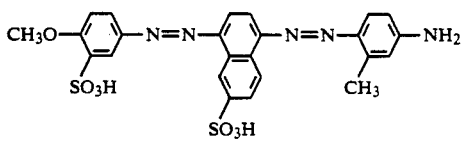

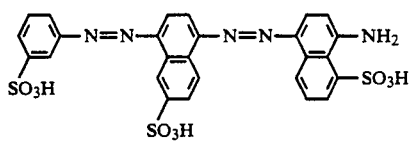

I claim:
1. A triphendioxazine dyestuff of the formula

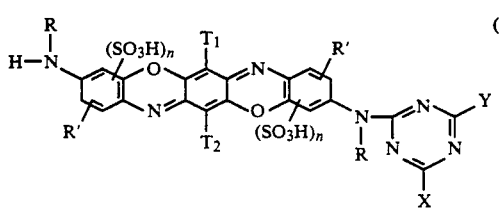

in which
- R represents hydrogen or $C_1$–$C_6$-alkyl, which is unsubstituted or substituted by a radical selected from the group consisting of —OH, —$OCH_3$, $OC_2H_5$, —COOH, —$SO_3H$, —CN and —Cl,
- R' represents hydrogen, halogen, carboxyl, $C_1$–$C_4$-alkyl or $C_1$–$C_4$-alkoxy,
- $T_1$ and $T_2$ each represent hydrogen, chlorine, bromine, substituted or unsubstituted $C_1$–$C_4$-alkyl, substituted or unsubstituted $C_1$–$C_4$-alkoxy, substituted or unsubstituted phenyl or substituted or unsubstituted phenoxy; the alkyl and alkoxy substituents being selected from the group consisting of $C_1$–$C_4$-alkoxy and —$OSO_3H$, and the phenyl and phenoxy substituents being selected from the group consisting of —Cl, —Br, $C_1$–$C_4$-alkyl, $C_1$–$C_4$-alkoxy and —$SO_3H$,
- X represents hydrogen, lower alkyl; substituted or unsubstituted phenyl, the substituents being selected from the group consisting of Cl, F, lower alkyl and lower alkoxy, or represents a radical of the formula —S—$R_2$ or —O—$R_3$, in which
- $R_2$ represents a phenyl radical which can be substituted by chlorine, sulpho or nitro, or represents a lower alkyl radical which can be substituted by hydroxyl or carboxyl, and
- $R_3$ represents hydrogen, a lower alkyl radical or a phenyl radical which can be substituted by sulpho or carboxyl, or
- X represents an amino group of the formula

in which
- $R_1$ represents hydrogen, a lower alkyl radical, which is unsubstituted or mono- or disubstituted by hydroxyl, sulphato, lower alkoxy, sulpho, carboxyl or phenyl; or represents an araliphatic radical or a cycloaliphatic radical, and
- Z represents hydrogen, a lower alkyl radical, which is unsubstituted or substituted by hydroxyl, lower alkoxy, sulphato, sulpho or carboxyl, or represents an unsubstituted phenyl or naphthyl radical, or a phenyl or naphthyl radical which is substituted by halogen, lower alkyl, lower alkoxy, nitro, sulpho, carboxyl, sulphamoyl, carbamoyl, alkylcarbonylamino, phenylcarbonylamino, phenylureido, phenylsyulphonylamino, alkylaminocarbonyl, phenylaminocarbonyl, phenylsulphonylamino, phenoxy, thiophenoxy, phenylethenyl, phenylamino, phenylsulphonyl, phenylcarbonyl, each of which is substituted or unsubstituted, and the substituents for the substituted alkylcarbonylamino and alkylaminocarbonyl radicals being independently selected from the group consisting of sulpho, carboxyl, methoxy, hydroxyl and acetylamino, and the substituents for the phenyl parts of the substituted phenylcarbonylamino, phenylureido, phenylsulphonylamino, phenylaminocarbony, phenylsulphonylamino, phenoxy, thiophenoxy, phenylethenyl, phenylamino, phenylsulphonyl and phenylcarbonyl radicals being independently selected from the group consisting of sulpho, carboxyl, lower alkyl, lower alkoxy, chlorine, acetylamino, ureido and hydroxyl,
- Z represents unsubstituted benzyl or benzyl which is substituted by lower alkyl, lower alkoxy, sulpho or carboxyl, or
- represents hydroxyl, lower alkoxy, amino, phenylamino or lower alkylamino, or
- $R_1$ and Z together with the nitrogen atom to which they are attached form a morpholine, piperidine, pyrrolidine or piperazine ring and
- Y represents

in which
- $R_1'$ represents hydrogen, a lower alkyl radical, which is unsubstituted or mono- or disubstituted by hydroxyl, sulphato, lower alkoxy, sulpho, carboxyl or phenyl; or represents an araliphatic radical or a cycloaliphatic radical, and
- Z' represents hydrogen, a lower alkyl radical, which is unsubstituted or substituted by hydroxyl, lower alkoxy, sulphato, sulpho and carboxyl, or represents an unsubstituted phenyl or naphthyl radical or a phenyl or naphthyl radical which is substituted by halogen, lower alkyl, lower alkoxy, nitro, sulpho, carboxyl, sulphamoyl, carbamoyl or alkylcarbonylamino, or represents an unsubstituted benzyl radical or a benzyl radical which is substituted by lower alkyl, lower alkoxy, sulpho or carboxyl, or represents hydroxyl, lower alkoxy, amino, phenylamino or a lower alkylamino group, or
- $R_1'$ and Z' together with the nitrogen atom to which they are bound, represent a morpholine, piperidine, pyrrolidine or piperazine ring, or
- Z' represents the radicals $Z_1'$, $Z_2'$ or $Z_5'$ in which $Z_1'$ represents 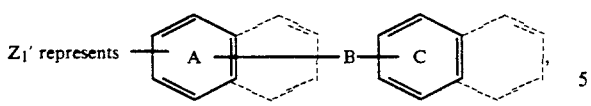

in which the phenylene or naphthylene radical A and the phenyl or naphthyl radical C can be substituted and B represents a direct bond or a bridging member selected from the group consisting of

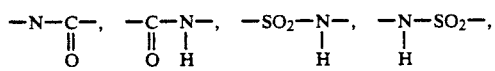

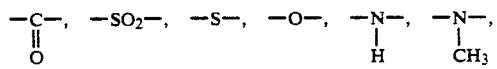

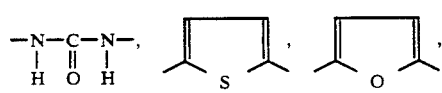

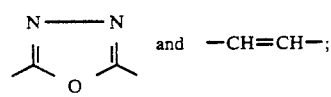 and —CH=CH—;

$Z_2'$ represents one of the following radicals:

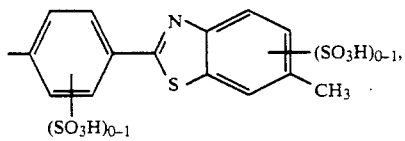

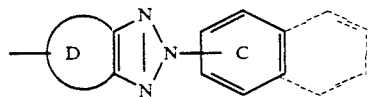

or

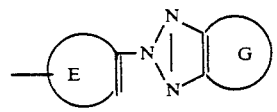

in which
D represents the radical of a substituted or unsubstituted benzene or naphthalene ring and the phenyl or naphthyl ring C can be substituted,
E represents a substituted or unsubstituted phenylene or naphthalene radical and
G represents the radical of a substituted or unsubstituted benzene or naphthalene ring, and
$Z_5'$ represents

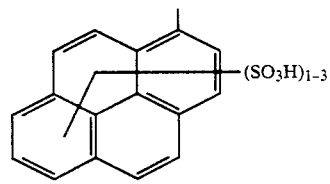

n represents 0 or 1, wherein when n represents 1 the sulpho group is in the ortho position relative to substituents

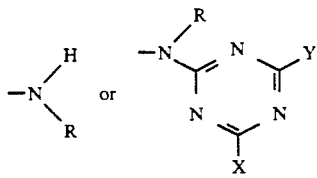

the substituents for A, C, D, E and G being independently selected from the group consisting of fluorine, chlorine, bromine, $C_1$-$C_4$-alkyl, $C_1$-$C_4$-alkoxy, nitro, sulpho, carboxyl, hydroxyl, $C_1$-$C_4$-alkylcarbonylamino, phenylcarbonylamino, phenylureido and ureido, each of which is itself unsubstituted or substituted by chlorine, methoxy or methyl, and wherein C can further be substituted by phenyl-or naphthylazo groups.

2. A triphendioxazine dyestuff according to claim 1 in which
Y represents

in which
$R_1'$ represents hydrogen and
$Z'$ represents the radicals $Z_1'$, $Z_2'$ or $Z_5'$ in which $Z_1'$ represents 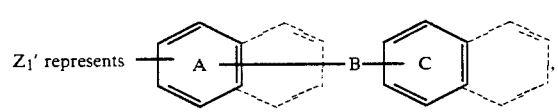

in which the phenylene or naphthylene radical A and the phenyl or naphthyl radical C can be substituted and B represents a direct bond or a bridging member selected from the group consisting of

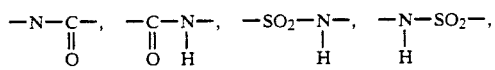

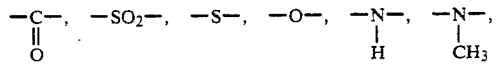

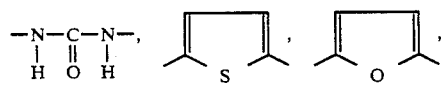

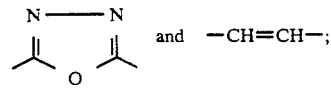 and —CH=CH—;

$Z_2'$ represents one of the following radicals:

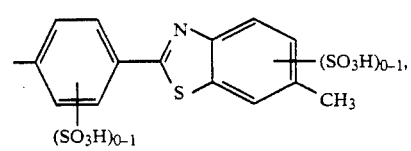

-continued

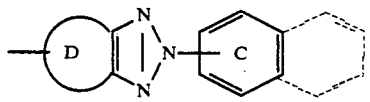

or

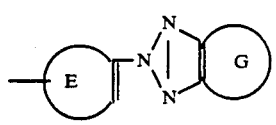

in which
D represents the radical of a substituted or unsubstituted benzene or naphthalene ring and the phenyl or naphthyl ring C can be substituted,
E represents a substituted or unsubstituted phenylene or naphthalene radical and
G represents the radical of a substituted or unsubstituted benzene or naphthalene ring, and
$Z_5'$ represents

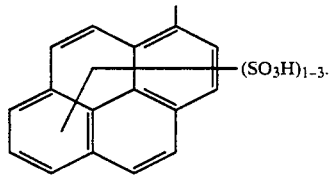

3. A triphendioxazine dyestuff according to claim 1, in which
R represents hydrogen,
R' represents hydrogen,
$T_1$ and $T_2$ each represent chlorine or methoxy, and
n represents 1.

4. A triphendioxazine dyestuff according to claim 1 in which
R represents hydrogen,
R' represents hydrogen,
$T_1$ and $R_2$ represent chlorine,
X represents an amino group of the formula

Z represents hydrogen, a lower alkyl radical which is unsubstituted or substituted by hydroxyl, lower alkoxy, sulphato, sulpho or carboxyl, or represents an unsubstituted phenyl or naphthyl radical, or a phenyl or naphthyl radical which is substituted by halogen, lower alkyl, lower alkoxy, nitro, sulpho, carboxyl, sulphamoyl, carbamoyl, alkylcarbonylamino, phenylcarbonylamino, phenylureido, phenylsulphonylamino, alkylaminocarbonyl, phenylaminocarbonyl, phenylsulphonylamino, phenoxy, thiophenoxy, phenylethenyl, phenylamino, phenylsulphonyl or phenylcarbonyl, each of which is substituted or unsubstituted, and the substituents for the substituted alkylcarbonylamino and alkylaminocarbonyl radicals being independently selected from the group consisting of sulpho, carboxyl, methoxy, hydroxyl and acetylamino, and the substituents for the phenyl parts of the substituted phenylcarbonylamino, phenylureido, phenylsulphonylamino, phenylaminocarbony, phenylsulphonylamino, phenoxy, thiophenoxy, phenylethenyl, phenylamino, phenylsulphonyl and phenylcarbonyl radicals being independently selected from the group consisting of sulpho, carboxyl, lower alkyl, lower alkoxy, chlorine, acetylamino, ureido and hydroxyl, or
Z represents hydroxy, lower alkoxy, amino, phenylamino or lower alkylamino, or
$R_1$ and Z together with the nitrogen atom to which they are attached form a morpholine, piperidine, pyrrolidine or piperazine ring, and
Y represents

in which
$R_1'$ represents hydrogen, and
$Z'$ represents $Z_2'$.

5. A dyestuff according to claim 1, wherein the radical $Z'$ is substituted with one to four radicals each of which is the same or different and is selected from the group consisting of sulpho and carboxyl radicals.

6. A process for the dyeing of a natural or synthetic material selected from the group consisting of paper, cotton, viscose, wool, silk, leather and synthetic polyamide, which comprises dyeing said material with a dyestuff according to claim 1.

* * * * *